United States Patent [19]

Horn et al.

[11] 4,024,116

[45] May 17, 1977

[54] HOT-MELT ADHESIVE BASED ON COPOLYAMIDES FROM CAPROLACTAM AND ALKYLENE DICARBOXYLIC ACID SALTS OF POLYETHER DIAMINE

[75] Inventors: Peter Horn, Ludwigshafen; Hans-Dietmar Haertl, Bruehl, both of Germany

[73] Assignee: BASF Aktiengesellschaft, Ludwigshafen, Germany

[22] Filed: Sept. 8, 1975

[21] Appl. No.: 610,979

[30] Foreign Application Priority Data

Sept. 21, 1974 Germany .......................... 2445167

[52] U.S. Cl. ..................... 260/78 L; 260/18 N; 260/33.4 R; 260/78 A; 428/474
[51] Int. Cl.$^2$ ........................................ C08G 69/14
[58] Field of Search ................................. 260/78 L

[56] References Cited

UNITED STATES PATENTS

| | | | |
|---|---|---|---|
| 3,850,887 | 11/1974 | Halas et al. | 260/78 L |
| 3,933,762 | 1/1976 | Naito et al. | 260/78 L |

OTHER PUBLICATIONS

Chemical Abstracts, vol. 79, 1973, 43384b.
Chemical Abstracts, vol. 82, 1975, 32328x.
Chemical Abstracts, vol. 82, 1975, 44252f.
Chemical Abstracts, vol. 82, 1975, 112695e.

*Primary Examiner*—Harold D. Anderson
*Attorney, Agent, or Firm*—Keil, Thompson & Shurtleff

[57] ABSTRACT

A hot-melt adhesive comprising copolyamides obtained from (a) ϵ-caprolactam, (b) diamine salts of adipic acid, sebacic acid and/or azelaic acid and (c) alkylenedicarboxylic acid salts of polyether-diamines gives e.g. textile laminates which are particularly resistant to washing and dry-cleaning.

3 Claims, No Drawings

HOT-MELT ADHESIVE BASED ON COPOLYAMIDES FROM CAPROLACTAM AND ALKYLENE DICARBOXYLIC ACID SALTS OF POLYETHER DIAMINE

The present invention relates to a hot-melt adhesive based on copolyamides, for laminating various materials, especially textiles.

Belgian Patent Specifications 752,668 and 807,858 and German Auslegeschrift (German Printed Application) 1,253,449 disclose the use of copolyamides based, firstly, on ω-aminoundecanoic acid and laurolactam and, secondly, the hexamethylenediamine salt of dodecanedicarboxylic acid, for laminating textiles. However, these hot-melt adhesives are frequently unsatisfactory in respect of bond strength, resistance to washing with soap liquors and resistance to organic solvents, especially chlorohydrocarbons, which are employed in dry-cleaning.

It is an object of the present invention to provide hot-melt adhesives based on copolyamides, especially for laminating textiles, which exhibit greatly improved bond strength, excellent resistance to soap liquors and outstanding resistance to chlorohydrocarbons.

We have found that this object is achieved by hot-melt adhesives which contain a copolyamide of A. from 10 to 40 parts by weight of ε-caprolactam, B. from 10 to 40 parts by weight of a salt of adipic acid and/or sebacic acid and/or azelaic acid with a diamine of the general formula

  (I)

$$H_2N-(CH_2)_n-NH_2 \quad (I)$$

in which n is a whole number from 2 to 6, and

C. from 20 to 60 parts by weight of a salt of a dicarboxylic acid of the general formula $$HOOC-(CH_2)_n-COOH \quad (II)$$

in which n is a whole number from 7 to 11, with a diamine of the general formula

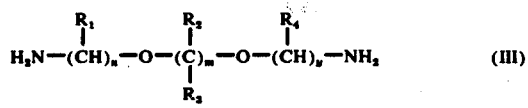  (III)

in which n, m and y are identical or different and each is from 2 to 6 and $R_1$, $R_2$, $R_3$ and $R_4$ are H and/or alkyl of 1 to 3 carbon atoms.

The essential feature of the hot-melt adhesives of the invention is that they contain component C, ie. the salt of the ether-diamine (III). Such ether-diamines may be manufactured by conventional methods, e.g. in accordance with the following equations:

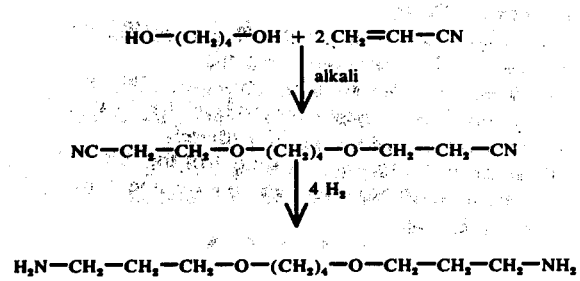

The components B and C employed as salts for the manufacture of the copolyamides each comprise equimolar amounts of their constituents, ie. component B is, eg., a salt of 1 mole of adipic acid and 1 mole of hexamethylenediamine and component B is, eg., a salt of 1 mole of decane-1,10-dicarboxylic acid and 1 mole of 4,9-dioxadodecane-1,12-diamine. The salts may be manufactured by conventional methods, eg. by fusing their constituents.

The hot-melt adhesives of the invention may be used, particularly in the form of powder, for laminating textiles. Advantageously, the manufacture of the copolyamides is carried out so as to give a product with a degree of condensation corresponding to a Fikentscher K value (measured at 0.5% strength in m-cresol at 20° C) of from 50 to 80 (H. Fikentscher, Cellulosechemie 13, 58 (1932)). The degree of condensation may be varied by the conventional method of adding a chain regulator, eg. a monofunctional carboxylic acid, such as stearic acid or propionic acid, prior to the polycondensation. The polycondensation is in most cases carried out at from 180° to 300° C, preferably from 220° to 280° C.

Hot melt adhesives based on

A. from 35 to 45 parts by weight of ε-caprolactam,

B. from 10 to 30 parts by weight of the hexamethylenediamine salt of adipic acid and C. from 35 to 45 parts by weight of the 4,9-dioxadodecane-1,12-diamine salt of decane-1,10 dicarboxylic acid are of particular interest.

In the Examples, parts are by weight.

EXAMPLE 1 a. Manufacture of the copolyamide 4-parts of ε-caprolactam, 2 parts of the hexamethylenediamine salt of adipic acid, 4-parts of the 4,9-dioxadodecane-1,12-diamine salt of decane-1,10-dicarboxylic acid and 1 part of water are introduced into an autoclave of 40 liters capacity. The precondensation is carried out by heating the mixture to 270° C, during which the pressure rises to 20 atmospheres gauge. The reaction mixture is kept at this temperature for one hour and is then brought back to normal pressure in the course of 2 hours. Post-condensation is carried out by heating the reaction mixture at 270° C for a further 2 hours, in a stream of nitrogen. It is then dried and granulated by conventional method. The dried granules have a K value (measured at 0.5% strength in m-cresol) of 70.1 and a melt index (measured according to DIN 53,735) at 190° C of 15.8 g/10 minutes. The product is particularly suitable for use as a hot-melt adhesive, especially for laminating polyester fabrics, but may also be used as a hot-melt adhesive for metals.

b. Measuring the bond strength

The test specimen is prepared as follows: a textile fabric consisting of polyethylene terephthalate fibers is impregnated with the copolyamide (a) over an area of 400 cm² by pressing an 0.3 mm thick film of the copolyamide onto the fabric at from 140° to 200° C under a pressure of up to 200 atmospheres gauge. An untreated fabric of the same textile is laminated onto the fabric impregnated with the copolyamide at from 140° to 180° C under a pressure of at most 5 atmospheres gauge. The bond strength is determined by the conventional method of pulling apart 5 cm wide strips of the laminate. Using copolyamide (a), the laminated textile sample has a bond strength of 20 kg per 5 cm. In contrast, the copolyamides of the Example of Belgian Patent Specification 807,858 give a bond strength of only 10 kg per 5 cm under otherwise identical conditions.

c. Determination of the resistance to dry-cleaning

The textile samples laminated with polyamide (a) of the invention as described under (b) are dry-cleaned by washing 5 times with boiling perchloroethylene. This causes the bond strength to fall by at most 5%, to about 19 kg/5 cm. In contrast, the bond strength of the strips which have been laminated with polyamides of Belgian Patent Specification 807,858 falls to 9 kg/5 cm.

d. Resistance to washing with soap liquors

Textile samples laminated as in (b) are washed for 5 periods of 45 minutes at 60° C, using an 0.7% strength by weight aqueous soap solution. This causes the bond strength of the sample to fall to about 14 kg/5 cm, ie. by 30%. In contrast, the bond strength of a strip laminated with a copolyamide of Belgian Patent Specification 807,858 falls to about 9 kg/5 cm in this wash test.

EXAMPLES 2 - 7

The copolymers of Examples 2 to 7 are manufactured, and tested, as in Example 1. The results are summarized in the Table.

in which $n$ is a whole number from 2 to 6, and
C. from 20 to 60 parts by weight of a salt of a dicarboxylic acid of the general formula $$HOOC-(CH_2)_n-COOH \quad (II)$$

in which $n$ is a whole number from 7 to 11, with a diamine of the general formula

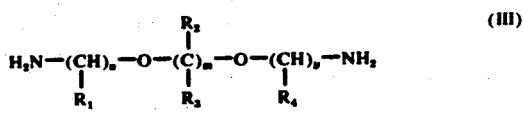

in which $n$, $m$ and $y$ are identical or different and each is from 2 to 6 and the individual radicals $R_1$, $R_2$, $R_3$ and $R_4$ are identical or different and each is H or alkyl of 1 to 3 carbon atoms.

2. A hot-melt adhesive as set forth in claim 1, wherein the copolyamide has a Fikentscher K value of

TABLE

| Composition of the copolymer [% of starting components] | Bond strength [kg/5 cm] | Bond strength after dry-cleaning [kg/5 cm] | Bond strength after washing with soap liquors [kg/5 cm] | K value of the copolymer, measured at 0.5% strength in m-cresol |
| --- | --- | --- | --- | --- |
| 40% of ε-caprolactam<br>40% of the 4,9-dioxadodecane-1,12-diamine salt of HOOC-(CH₂)₁₄-COOH<br>20% of the hexamethylenediamine salt of adipic acid | 16.0 | 15.0 | 13.6 | 63.2 |
| 40% of ε-caprolactam<br>40% of the 4,9-dioxadodecane-1,12-diamine salt of decane-1,10-dicarboxylic acid<br>20% of the hexamethylenediamine salt of azelaic acid | 17.0 | 17 | 14.0 | 70.1 |
| 40% of ε-caprolactam<br>10% of the hexamethylenediamine salt of adipic acid<br>40% of the 4,9-dioxadodecane-1,12-diamine salt of decane-1,10-dicarboxylic acid<br>10% of the hexamethylenediamine salt of sebacic acid | 15.0 | 12.0 | 10.5 | 69.6 |
| 20% of the hexamethylenediamine salt of adipic acid<br>40% of ε-caprolactam<br>40% of the 6,6-dimethyl-4,8-dioxaundecane-1,11-diamine salt of decane-1,10-dicarboxylic acid<br>20% of the hexamethylenediamine salt of adipic acid | 15.0 | 15.0 | 13.5 | 69.8 |
| 40% of ε-caprolactam<br>40% of the 4,10-dioxa-tridecane-7-methyl-1,13-diamine salt of decane-1,10-dicarboxylic acid<br>20% of the hexamethylenediamine salt of adipic acid | 15 | 14 | 13.8 | 58 |
| 50% of ε-caprolactam<br>30% of the 4,9-dioxadodecane-1,12-diamine salt of decanedicarboxylic acid | 14 | 14 | 12 | 72.3 |

We claim:

1. A hot-melt adhesive consisting essentially of a copolyamide of
   A. from 20 to 60 parts by weight of ε-caprolactam,
   B. from 10 to 40 parts by weight of a salt of adipic acid, sebacid acid, azelaic acid or mixtures thereof with a diamine of the general formula

from 50 to 80, measured in 0.5% strength solution in m-cresol at 20° C.

3. A hot-melt adhesive as set forth in claim 1 consisting essentially of a copolyamide of
   A. from 35 to 45 parts by weight of ε-caprolactam,
   B. from 10 to 30 parts by weight of the hexamethylenediamine salt of adipic acid and
   C. from 35 to 45 parts by weight of the 4,9-dioxadodecane-1,12-diamine salt of decane-1,10-dicarboxylic acid.

* * * * *